United States Patent
Shver

(10) Patent No.: US 7,704,445 B2
(45) Date of Patent: *Apr. 27, 2010

(54) SYSTEMS AND METHODS FOR ACCESSING A FURNACE MELT

(75) Inventor: Valery G. Shver, Alpharetta, GA (US)

(73) Assignee: Process Technology International, Inc., Tucker, GA (US)

( * ) Notice: Subject to any disclaimer, the term of this patent is extended or adjusted under 35 U.S.C. 154(b) by 236 days.

This patent is subject to a terminal disclaimer.

(21) Appl. No.: 11/500,258

(22) Filed: Aug. 7, 2006

(65) Prior Publication Data

US 2007/0001353 A1 Jan. 4, 2007

Related U.S. Application Data

(63) Continuation-in-part of application No. 11/170,254, filed on Jun. 29, 2005.

(51) Int. Cl.
*F27D 3/14* (2006.01)
*C21B 7/16* (2006.01)
*C21C 7/72* (2006.01)

(52) U.S. Cl. .................. 266/216; 266/47; 266/217; 266/218; 266/225; 266/226; 266/265; 266/270; 75/10.39; 75/10.4; 75/10.46; 75/10.52; 373/75; 373/76; 373/79

(58) Field of Classification Search .................. 266/47, 266/216–218, 225–226, 265, 270; 75/10.39, 75/10.4, 10.46, 10.52; 373/75–76, 79
See application file for complete search history.

(56) References Cited

U.S. PATENT DOCUMENTS

| | | | | |
|---|---|---|---|---|
| 2,821,378 | A | * | 1/1958 | Tama .......................... 266/236 |
| 3,752,895 | A | * | 8/1973 | Clishem et al. ............... 373/85 |
| 3,873,073 | A | * | 3/1975 | Baum et al. ................... 266/89 |
| 4,077,614 | A | | 3/1978 | Udo et al. |
| 4,392,637 | A | | 7/1983 | Weber et al. |
| 4,615,511 | A | * | 10/1986 | Sherwood .................... 266/208 |
| 5,069,553 | A | | 12/1991 | Phillippi |

(Continued)

FOREIGN PATENT DOCUMENTS

DE 3419769 * 1/1985

OTHER PUBLICATIONS

Korean Intellectual Property Office International Search Report for PCT Application No. PCT/US2007/017543 dated Dec. 18, 2007.

(Continued)

*Primary Examiner*—Roy King
*Assistant Examiner*—Lois Zheng
(74) *Attorney, Agent, or Firm*—Troutman Sanders LLP; James E. Schutz

(57) ABSTRACT

A method and apparatus for accessing a furnace melt are provided. Preferably, the method and apparatus provide for the safe and efficient access to the molten metal melt in a furnace. According to one aspect of the invention used in a steel making process in an electric arc furnace, a furnace aperture plug is reciprocated through a furnace aperture, the furnace aperture plug is retracted from the furnace aperture, access is provided to the molten metal melt in the furnace, and the furnace aperture plug is reinserted into the furnace aperture when the access is concluded.

18 Claims, 8 Drawing Sheets

U.S. PATENT DOCUMENTS

| | | | |
|---|---|---|---|
| 5,118,084 A * | 6/1992 | Paulus et al. ................. | 266/236 |
| 5,410,566 A | 4/1995 | Steins et al. | |
| 5,956,365 A | 9/1999 | Haissig | |
| 6,004,504 A | 12/1999 | Vallomy | |
| 6,171,364 B1 | 1/2001 | Sarma et al. | |
| 6,212,218 B1 * | 4/2001 | Shver .......................... | 373/72 |
| 6,471,911 B1 | 10/2002 | Pleschiutschnigg et al. | |
| 2007/0001352 A1 | 1/2007 | Shver | |

OTHER PUBLICATIONS

U.S. International Search Report and Written Opinion for PCT/US2006/025035 dated Dec. 4, 2006.

* cited by examiner

SYSTEMS AND METHODS FOR ACCESSING A FURNACE MELT

CROSS-REFERFNCE TO RELATED APPLICATIONS

This application is a continuation-in-part of U.S. patent application Ser. No. 11/170,254, filed Jun. 29, 2005, and entitled "Method and Apparatus for Testing Characteristics of a Furnace Melt."

TECHNICAL FIELD

The present invention relates generally to a method and apparatus used in metal melting, refining and processing, and more particularly, a method and apparatus for accessing a furnace melt.

BACKGROUND

Electric arc furnaces (EAFs) make steel by using an electric arc to melt one or more charges of scrap metal, hot metal, iron based materials, or other meltable materials, which is placed within the furnace. Modern EAFs may also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the melting.

If the EAF is used as a scrap melter, the scrap burden is charged by dumping it into the furnace through the roof opening from buckets, which also may include charged carbon and slag forming materials. A similar charging method using a ladle for the hot metal from a blast furnace may be used along with injection of the DRI by a lance to produce the burden. Additionally, these materials could be added through other openings in the furnace.

In the melting phase, the electric arc and burners melt the burden into a molten pool of metal, termed an iron carbon melt, which accumulates at the bottom or hearth of the furnace. Typically, after a flat bath has been formed by melting of all introduced burden, the electric arc furnace enters a refining and/or decarburization phase. In this phase, the metal continues to be heated by the arc until the slag forming materials combine with impurities in the iron carbon melt and rise to the surface as slag. During the heating of the iron carbon melt, it reaches the temperature and conditions when carbon in the melt combines with oxygen present in the bath to form carbon monoxide bubbles. Generally, flows of oxygen are blown into the bath with either lances or burner/lances to produce a decarburization of the bath by the oxidation of the carbon contained in the bath.

The resulting decarburization reduces the carbon content of the bath to a selected level. If an iron carbon melt is under 2% carbon it becomes steel. Except for operations using the hot metal from the Blast furnaces, the EAF steel making processes typically begin with burdens having less than 1% carbon. The carbon in the steel bath is continually reduced until it reaches the content desired for producing a specific grade of steel, down to less than 0.1% for low carbon steels.

The EAF steel making process is an extremely exacting process that involves the simultaneous management of a variety of different variables. The numerous variables of the melting process must be kept within certain tolerances throughout the process to ensure an accurate and efficient melt is conducted. For instance, chemical energy can be added at certain stages of the process to facilitate the progression of the melt. Additionally, other chemicals can be inserted into the furnace to alter the state of the melt to progress the steel making process and protect the furnace equipment. Furthermore, it is desirable to identify when the process is complete and the steel is ready for removal. The steps involved in the steel making process, including inserting additional chemical energy, inserting other chemical substances, determining the whether the steel is ready for tapping, and many other necessary tasks, require that the operator have a safe, effective, and efficient means by which to access the melt. Conventionally, the means provided to the operator to access the iron carbon melt have been detrimental to the progression of the steel making process, inefficient, and hazardous to the operator.

First, the lance opening must be kept clear of slag in EAFs in which the temperature and sampling port are located lower in the furnace. This may be done with a constant flow of air through the lance opening, if this opening is relatively small. Larger openings require a significant volume of constant air flow, which is not preferable since it may be costly to provide such a high volume of air and because it may cool the furnace. Counteracting such cooling affects is also costly. In practice, the protection of openings by the flow of compressed air does not result in a clean, unplugged opening.

Second, the furnace operator may be required to inject a variety of chemicals into the furnace during the steel making process to ensure the melt is progressing appropriately. For example, chemicals such as, but not limited to, lime, calcium, carbon, oxygen, aluminum, and silicon, may be introduced into the bath to alter the chemical composition of the steel. The added chemicals can aid in such processes as the carburization or decarburization of the melt or the creation of foamy slag to shield the electric arc and protect the furnace equipment. The conventional methods of insertion of chemicals also require the operator to expose openings in the furnace's roof or upper shell. The lower the position of the openings within a furnace, the more effort required to keep the opening clean. The current trend is to keep the ports, or openings higher above the level of molten steel. This results in a significant loss of small particles through the fume evacuation system of EAFs.

Third, the furnace operator encounters many challenges with the conventional methods of determining whether the melt is ready for tapping. A furnace must reach very high temperatures to melt burden into molten metal. For example, scrap steel melts at approximately 2768° F. To achieve such high temperatures, steel making furnaces are generally fully enclosed with a minimal number of openings. Due to the negative pressures in the EAF, furnace openings may allow ambient air into the furnace and create a cold spots. Additionally, it is typically desirable to raise the temperature of the melt sufficiently above the melting point (typically to 2950° F.-3050° F.) to allow the melt to be transferred from the furnace to a desired location and further processed without prematurely solidifying.

Additionally, due to the high temperature, it is not practical to install a permanent temperature gauge in the furnace to monitor the temperature of the molten metal bath. Accordingly, steel makers typically use disposable thermocouples to check the liquid bath temperature. Disposable probes are typically mounted in cardboard sleeves that slide onto a steel probe pole, which has internal electrical contracts. The disposable probe transmits an electrical signal to the steel pole, which in turn transmits the signal to an electronic unit for interpretation. Additional probes may be used to determine the carbon content and dissolved oxygen levels in the molten metal. Various disposable temperature and chemical content probes are known in the art.

Typically, disposable probes are inserted into the furnace through the slag door. Unfortunately, there are several drawbacks to measuring the temperature through the open slag door. For example, when the door is open, a large amount of cold air can be drawn into the furnace. If the molten metal bath is below the desired temperature, the additional heat losses due to temperature probing will require more energy to be consumed to reach the target temperature.

Another draw back to measuring steel bath parameters through the slag door involves the process of inserting a probe into the liquid bath. Many years ago, probes were only introduced into the melt manually. This manual operation puts the operator at great risk of injury. Today, some steel plants and foundries still use this manual procedure because most alternative systems are very costly. Each year, operators are seriously injured or even killed while taking furnace measurements manually through the open slag door. These injuries typically occur when uncontrollable reactions occur in the furnace thereby causing injury to the operator.

These reactions are caused by rapid reaction of oxygen and carbon in the furnace. Oxygen is injected into the steel bath to remove or balance the elements such as, but not limited to, sulphur, phosphorus, manganese, silicon and carbon. Although carbon reacts quickly with oxygen, as the carbon concentration in the steel bath decreases below 0.10% by weight, the oxygen-carbon reaction slows down considerably. In order to reduce carbon below 0.05% in the steel bath, the active or free oxygen level in the steel must be about 500 ppm. If any material such as slag or scrap were to fall from the walls of the furnace into the steel bath, an eruption will occur. The oxidizable elements in the slag or steel will react with the active oxygen in the steel bath and create, very quickly, a large amount of combustible gasses. These gases can erupt with enough force to throw flame, slag and steel a great distance. In addition, when the combustible gases created in this reaction are exiting the furnace through the slag door, they rapidly combust with the air outside of the furnace thus increasing the intensity of the reaction.

Such reactions occur so quickly that it creates an explosive effect. Tragically, if such reactions occur while the slag door is open for a manual measurement, the slag boil can overflow the furnace and cause great harm to the operator. Now, many furnace operators use a large, and expensive, mobile device for inserting probes into the furnace. Since the slag door must remain clear for removing slag from the furnace, a dedicated temperature probe insertion tool can not be installed adjacent to the slag door. Rather, the device must either have a very long arm to reach through the slag door to the bath, or it must be mobile so that it can be moved out of the way of the door for other processes.

When the slag door is opened, any slag and metal trapped at the door opening must be cleared to allow insertion of the measurement probe. Clearing the door can be done with a large ram that pushes the slag and scrap out of the door opening and into the melt. Since any scrap trapped in the opening is pushed into the melt adjacent to the door, a probe inserted through the door can not easily measure the temperature of the melt. It is a typical practice in the industry to wait for this scrap to be melted before taking a measurement. This practice adds additional time to the melting phase, and therefore additional expense, to the steel making process.

There are other potential options available for insertion of the temperature probe, but each has significant drawbacks and is not typically used in the industry. First, an opening could be provided in the side wall of the furnace and a temperature probe could be inserted through this opening. Unfortunately, there is not a good location for providing such opening. If the opening were provided low in the furnace, close to the melt, it would become clogged with slag. Thus, the slag would need to be removed prior to insertion of the probe. Prior to the present invention, there was not a device available for easily and efficiently cleaning slag from such an opening. Cleaning the slag from the hole is an onerous task because the slag solidifies on the walls of the furnace and can become quite thick. Thus, it would be difficult to clean the slag from the opening and insert the temperature probe in an efficient manner.

Alternatively, the opening could be provided very high on the side wall of the furnace where it would be less likely to become clogged with slag. This solution is also not desirable because the access opening would be far from the melt. Thus, an exceptionally long probe pole would be needed to reach down into the melt. To operate this pole, a long and heavy structure adjacent to the furnace wall must be constructed. The location of this structure is limited by potential interference with the movement of the furnace roof and the scrap bucket during the charge of melting material.

Finally, an additional drawback relates to the utilization of different systems for the introduction of chemical energy into the EAF shell, such as burners, oxygen injectors, carbon injectors and others is the standard practice of modern EAF steel melting. The systems are located on different parts of furnace's shell, or roof and assist in scrap preheating, melting, steel decarburization and refining through the opening in the shells. These systems only function during certain phases of the process, and during the rest of process they must be maintained in a protective mode to keep the ports clean, such as pilot flame, or for the non-flamable apparatus, compressed air or nitrogen flow. The lower these openings are located in a furnace, the more effort required to keep the openings clean. The pilot flame, nitrogen, or compressed air flow increase the cost of operations and require the consumption of additional energy to make steel.

Therefore, it would be advantageous to provide a method and apparatus for accessing the melt through an opening in the furnace.

Therefore, it would be advantageous to provide a method and apparatus for inserting a lance through an opening in the furnace.

Therefore, it would be advantageous to provide a method and apparatus for inserting chemicals through an opening in the furnace.

Therefore, it would be advantageous to provide a method and apparatus for injecting chemicals into a molten metal bath through an opening in the furnace close to the bath.

Therefore, it would be advantageous to provide a method and apparatus for measuring the temperature of a molten metal bath through an opening in the furnace, other than the slag door.

Additionally, it would be advantageous to provide a method and apparatus for injecting chemicals into a molten metal bath through a dedicated chemical injection aperture.

Additionally, it would be advantageous to provide a method and apparatus for keeping a dedicated chemical injection aperture clear of slag and debris without using a constant flow of air.

Additionally, it would be advantageous to provide a furnace with a dedicated chemical injection aperture.

Therefore, it would be advantageous to provide a method and apparatus for protecting the openings in a furnace shell and roofs without using extensive amount of fuel, oxygen, nitrogen, or compressed air.

BRIEF SUMMARY OF THE INVENTION

The invention provides a method and apparatus for providing access to the melt in a metal melt furnace.

According to one aspect of the invention, a furnace aperture plug is reciprocated through a furnace aperture, the furnace aperture plug is retracted from the furnace aperture, access is provided to the furnace, and the furnace aperture plug is inserted into the furnace aperture.

According to another aspect of the invention, a furnace aperture plug is reciprocated through a furnace aperture, the furnace aperture plug is retracted from the furnace aperture, a burner device is enabled to insert a flame into the furnace through the furnace aperture, and the furnace aperture plug is inserted into the furnace aperture.

According to another aspect of the invention, a furnace aperture plug is reciprocated through a furnace aperture, the furnace aperture plug is retracted from the furnace aperture, a lance device is inserted through the furnace aperture and operated, then the lance device is retracted from the aperture, and the furnace aperture plug is inserted into the furnace aperture.

According to another aspect of the invention, a furnace aperture plug is reciprocated through a furnace aperture, the furnace aperture plug is retracted from the furnace aperture, chemicals are inserted into the melt through the furnace aperture, and the furnace aperture plug is inserted into the furnace aperture.

According to another aspect of the invention, a furnace aperture plug is reciprocated through a furnace aperture, the furnace aperture plug is retracted from the furnace aperture, a furnace probe is inserted through the furnace aperture, the furnace probe is retracted from the aperture, and the furnace aperture plug is inserted into the furnace aperture.

According to another aspect of the present invention, a furnace access apparatus includes a mounting enclosure for protecting the furnace access apparatus and mounting it in the furnace.

According to another aspect of the present invention, the furnace aperture plug may be reciprocated more than once during a metal melt cycle. Additionally, the furnace aperture plug may be reciprocated periodically during the metal melt cycle.

According to another aspect of the present invention, the furnace aperture plug is reciprocated to remove slag from the furnace aperture. Preferably, the reciprocation of the furnace aperture plug through the furnace aperture removes at least a portion of slag build up proximate the furnace aperture. Additionally, when the furnace aperture plug is reciprocated through the furnace aperture, it is extended through the aperture past the wall of the furnace enclosure and then retracted to its original closed position.

According to another aspect of the present invention, a furnace access apparatus for use in an electric arc furnace comprises a furnace aperture plug adapted for insertion into a furnace aperture and a furnace aperture plug reciprocator for moving the furnace aperture plug. Preferably, the furnace aperture plug reciprocator is coupled to the furnace aperture plug and adapted to move the plug between a retracted position and an inserted position relative to the furnace aperture. When the furnace aperture plug is in an inserted position, it closes the furnace aperture and prevents slag and other debris from entering the furnace access apparatus. When the furnace aperture plug is in a retracted position, it allows access to the furnace through the furnace aperture.

According to another aspect of the present invention, the furnace aperture plug reciprocator is a telescoping arm adapted to advance and retract the furnace aperture plug.

According to another aspect of the present invention, the furnace access apparatus mounting enclosure is fluid cooled and adapted to protect the furnace aperture plug and the furnace probe from the harsh environment of the furnace.

According to another aspect of the present invention, the furnace access apparatus is mounted on the refractory step of the furnace and is accessed through a side wall panel of the furnace.

According to yet another aspect of the present invention, the mounting enclosure includes a deflector for deflecting scrap charged in the furnace away from the furnace aperture plug. Preferably, the deflector is a porch sloped toward the inside of the furnace. Additionally, the mounting enclosure may include corrugations for retaining slag. The slag helps insulate the mounting device from the heat of the furnace.

These and other features as well as advantages, which characterize the various preferred embodiments of present invention, will be apparent from a reading of the following detailed description and a review of the associated drawings.

DETAILED DESCRIPTION OF PREFERRED EMBODIMENTS

Referring now the drawings, in which like numerals represent like elements, exemplary embodiments of the present invention are herein described.

Figure 1:
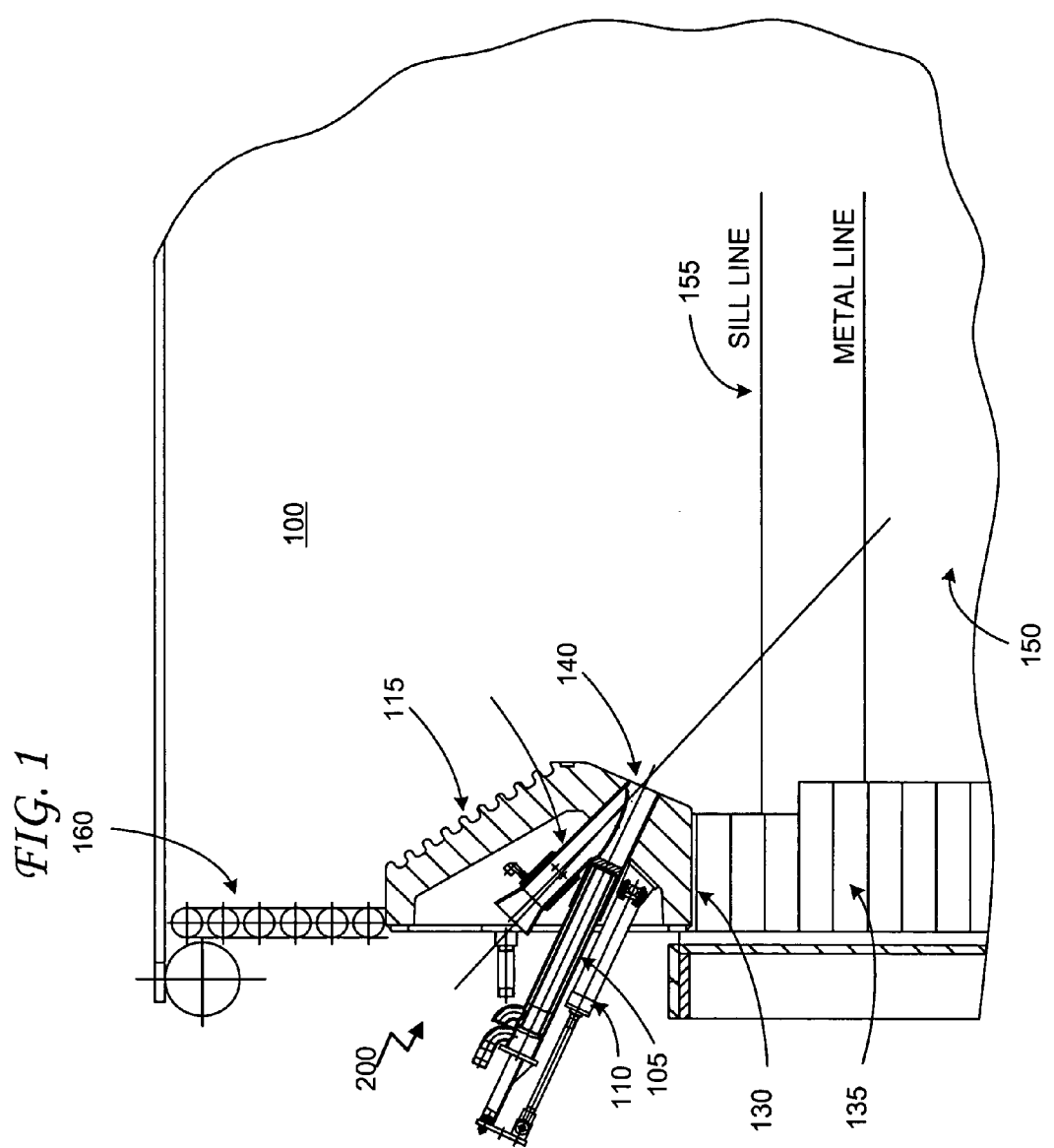
FIG. 1 is a cross-sectioned side view of an exemplary embodiment a furnace access apparatus mounted in an electric arc furnace and which is constructed in accordance with an exemplary embodiment of the present invention.

FIG. 1 is a cross-sectioned side view of an exemplary embodiment a furnace access apparatus mounted in an electric arc furnace ("EAF") and which is constructed in accordance with an exemplary embodiment of the invention. In an exemplary embodiment, the furnace 100 melts ferrous scrap, or other iron based materials, by means of an electric arc produced from one or more electrodes to collect a molten metal bath or melt 150 in its hearth. The metal bath level varies significantly during the melting process. The bath level generally begins with a hot heel level, which is the iron melt left from the previous heat. As multiple charges of scrap or other iron base materials are melted, the level rises. The furnace is typically filled to a level about 18 inches down from the sill line 155. Other steel making processes such as DRI melting and the ConSteel process produce similar bath level changes. Typically, the EAF hearth is generally spherical in shape and is made of refractory material able to withstand the high temperature of the molten metal. The hearth of the furnace 100 is typically surrounded by an upper shell comprised of a series of fluid cooled panels. It is known that the fluid cooled panels forming the side wall 160 of the furnace 100 can be of several conventional types. These panels are typically supplied with cooling fluid from circumferential supply conduits, which are connected to cause fluid to circulate through the panels and then exit to carry off heat.

Alternatively, spray cooled panels may be used in place of fluid cooled panels. In a typical spray cooled system, two concentric plate shells separated by a gap are used. Between the two shells are installed numerous spray nozzles that are adapted to spray the outside of the inner shell (the shell adjacent the interior of the furnace). The fluid sprayed onto the shell cools the shell material. In an alternative exemplary embodiment, the furnace 100 could be cooled by a device as disclosed in U.S. patent application Ser. No. 11/361,725 filed Feb. 24, 2006, entitled "Cooling Device For Use in an Electric Arc Furnace."

The melt 150, generally comprising iron and carbon, is generally covered with various amounts of slag, which is produced by the chemical reactions between the melt and slag forming materials added to the furnace before or during the melting process of the metal. Once the scrap metal or other burden has been melted, the metal bath 150 is generally refined by additives and decarburized by oxygen lancing. This produces the required chemistry for the melt and reduces the carbon content of the metal to the grade of steel desired.

After the electrodes are turned on, a foamy slag may be developed by injecting particulate carbon to protect the furnace components from radiation from the arc. During refining and thereafter, the metal bath 150 is typically heated by the electric arc above its melting temperature. The superheating is used to allow the metal bath 150 to remain at a high enough temperature while being transported in a ladle and while finishing other process steps. If the melt 150 does not contain an adequate carbon level for the grade of steel desired then it must be recarburized by adding carbon to the bath, or to the ladle, during or after tapping of the molten metal. The melt 150 may lack an adequate carbon level because of the materials which were melted to form the bath or because oxygen lancing has decreased the carbon content to below a desired threshold.

Figure 2:
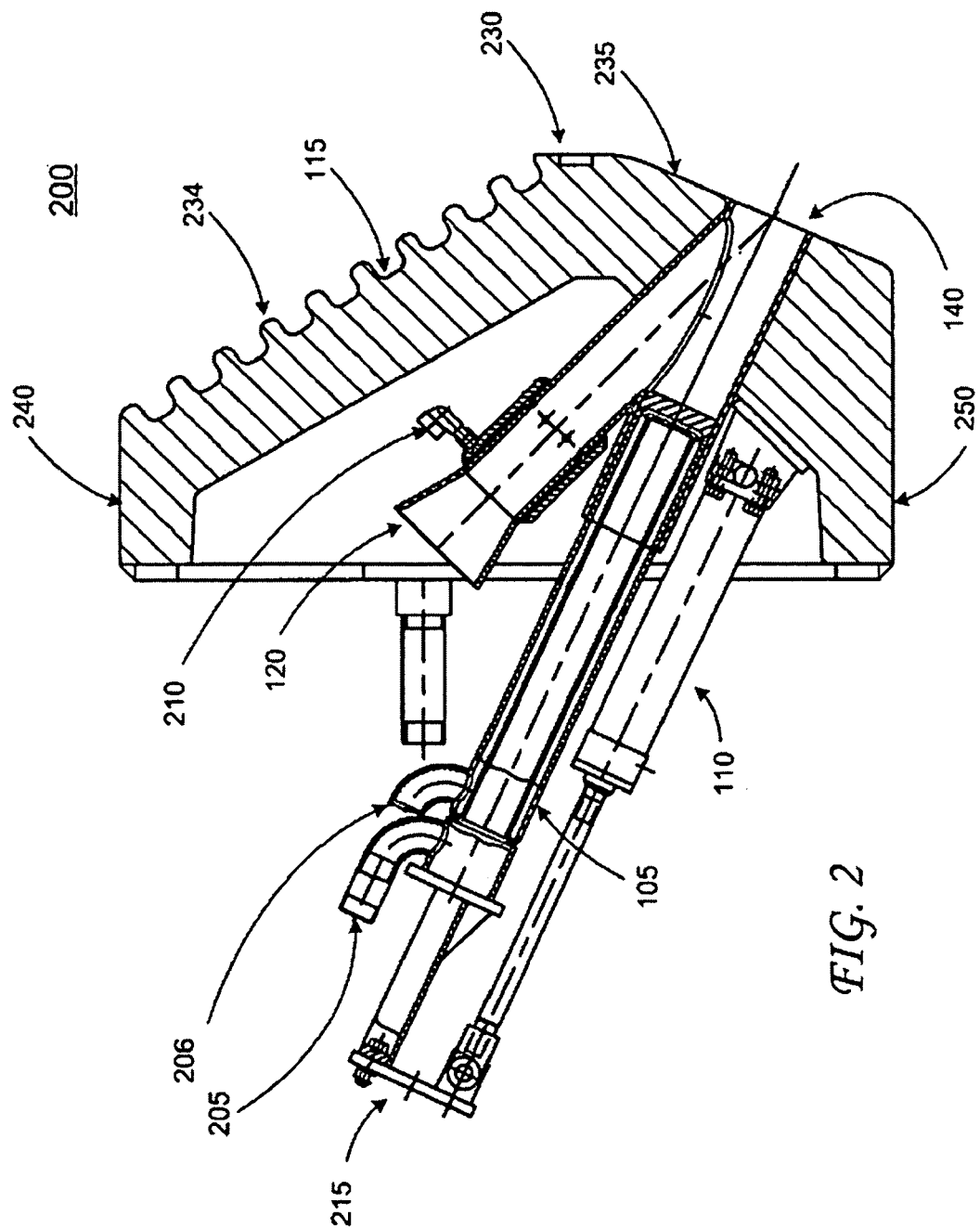
FIG. 2 is a cross-sectioned side view of the furnace access apparatus illustrated in FIG. 1 showing the furnace aperture plug in a retracted position permitting access through the furnace aperture.

FIG. 2 is a cross-sectioned side view of the furnace access apparatus illustrated in FIG. 1. As shown in FIG. 2, the furnace access apparatus 200, in accordance with an exemplary embodiment of the present invention, generally includes, but is not limited to, a furnace aperture 140, a furnace aperture plug 105, a furnace aperture plug reciprocator 110, and a furnace receptacle 120. When the furnace aperture plug 105 is in the retracted position, as shown in FIG. 2, the furnace aperture 140 provides access to the melt in a position sufficiently proximate the melt to allow for efficient and effective access to melt for a variety of tasks. In an exemplary embodiment, the furnace receptacle 120 is aligned with the furnace aperture 140 for accessing the interior of the furnace when the furnace plug is retracted.

Referring back to FIG. 1, the furnace access apparatus 200, is preferably mounted adjacent an opening in the fluid cooling side wall panel 160 of the furnace 100. In the illustrated embodiment, the mounting enclosure 115 preferably rests on the step 130 formed between the panels of the side wall 160 of the upper shell of the furnace 100 and the refractory wall of the hearth 135. Alternatively, the furnace access apparatus 200 could be supported or suspended from another suitable structural member of the furnace 100.

The furnace aperture plug 105 and furnace receptacle 120 can be mounted in the furnace access apparatus enclosure 115. The furnace access apparatus enclosure 115 is preferably mounted low on the side wall 160 of the furnace or on the refractory step 130 to provide access close to the surface of the melt 150. The mounting enclosure 115 also provides protection for the furnace aperture plug 105 and the furnace receptacle 120 from the intense heat of the furnace 100 and mechanical damage from falling scrap. In normal operation a slag covering forms on the mounting enclosure 115. The slag covering helps to insulate the mounting enclosure 115 from heat in the furnace.

As shown in FIG. 2, an exemplary embodiment of the furnace access apparatus enclosure 115 comprises a top fluid cooled panel 240, a front fluid cooled panel 230, and a bottom fluid cooled panel 250. Additionally, the front fluid cooled panel 230 may comprise an upper portion 234 that is sloped toward the center of the furnace and a lower portion 235 that is sloped inward toward the side of the furnace. Alternatively, the sloped portion 234 may be part of the top fluid cooled panel 240, or may be used in place of the top fluid cooled panel 240. Preferably, the upper portion 234 includes corrugations for trapping slag, thereby insulating the furnace access apparatus enclosure 115 from the intense heat of the furnace. Preferably, the lower portion 235 is sloped inward at a wet angle. A wet angle is an angle at which fluid will adhere to the surface although gravity pulls the fluid away from the surface. Preferably, the wet angle is between 5 and 10 degrees from vertical. The inward slope of the lower portion 235 of the front wall 230 of the enclosure 115, allows the furnace aperture 140 to be protected from falling scrap by the upper portion 234 of the front surface 230.

Figure 3:
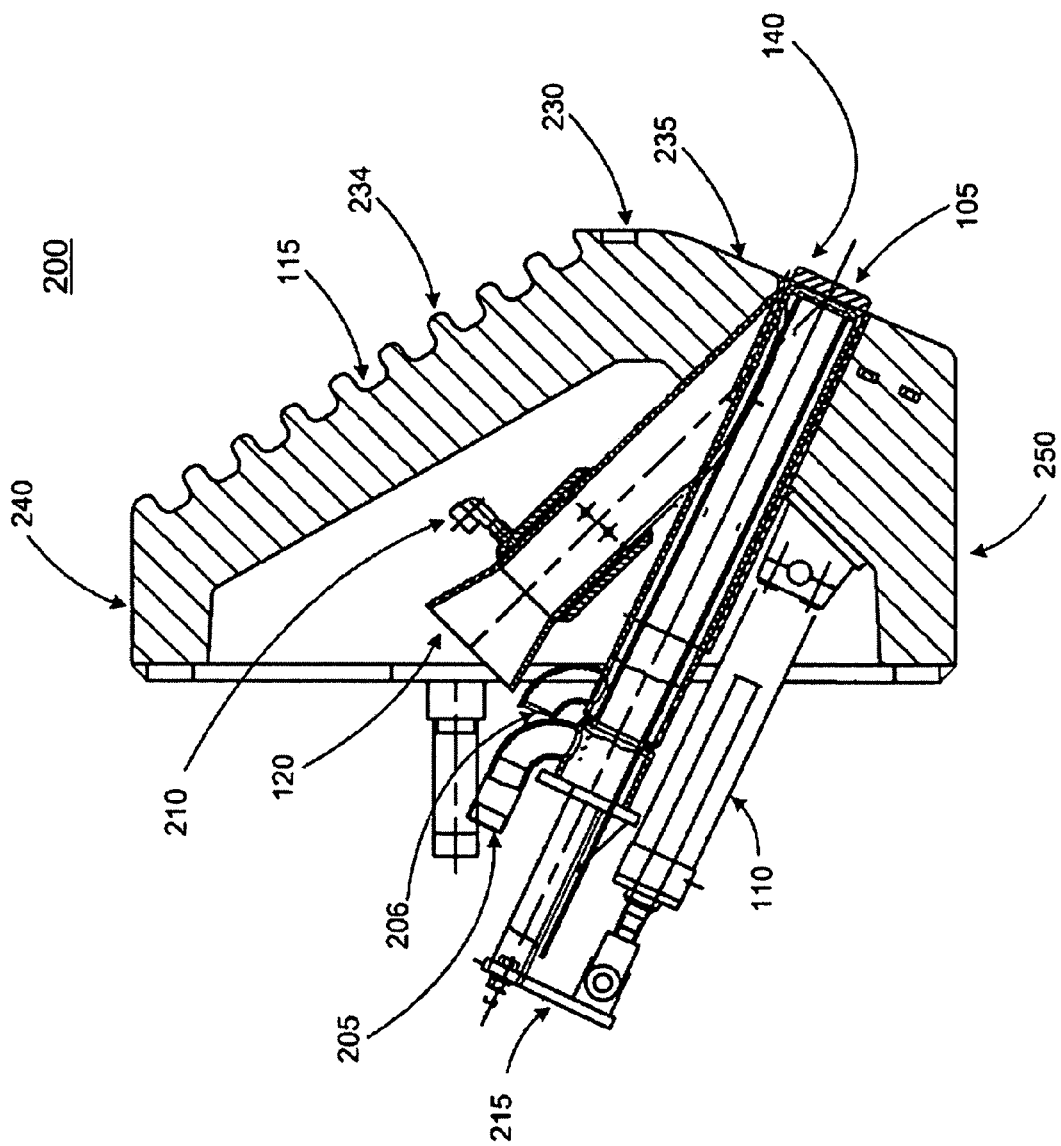
FIG. 3 is a cross-sectioned side view of the furnace access apparatus illustrated in FIG. 1 showing the furnace aperture plug in an inserted position.

Referring now to FIG. 3, which is a cross-sectioned side view of the furnace access apparatus enclosure with the furnace aperture plug 105 in its forward position. As shown in FIG. 3, when the furnace aperture plug 105 is in its forward (or closed, or inserted) position, the plug 105 fills the furnace aperture 140. In this position, the plug 105 prevents slag and other debris from entering the furnace access apparatus 200. It is typically preferable for the plug 105 to be positioned either flush with the exterior wall of the enclosure 115, or slightly extended through the aperture 140. If the furnace aperture plug 105 is positioned within the aperture such that it is slightly retracted, the furnace access apparatus should still operate correctly. However, it is desirable that the furnace aperture plug 105 block the aperture sufficiently so as to minimize slag and debris from exiting the furnace and to minimize ambient air from entering the furnace.

In an exemplary embodiment of the present invention, the furnace aperture plug 105 is fluid cooled to protect it from the intense heat of the furnace. Preferably, the side walls and the front face of the plug 105 include fluid channels for cooling the exterior surfaces. Alternatively, the plug may include internal spray nozzles to cool the front face of the plug from the inside. As shown in FIG. 2, fluid can be channeled through the plug 105 using fluid inlet 205 and fluid outlet 206. Those skilled in the art of steel making are familiar with the use of fluid cooling channels to cool furnace components. The use of fluid cooling channels is particularly desirable on the front face of the furnace aperture plug 105 because it is exposed to the heat of the furnace during portions of the melt cycle of the furnace.

In an exemplary embodiment of the present invention, the furnace aperture plug 105 is retracted by a furnace aperture plug reciprocator 110. Alternatively, another device can be used to retract the furnace aperture plug 105 from the furnace aperture 140. In another alternative embodiment, the furnace aperture plug 105 can be removed or retracted manually.

As illustrated in FIG. 2, the furnace aperture plug reciprocator 110 can be a telescoping arm coupled to the furnace aperture plug 105. The furnace aperture plug reciprocator 110 can be coupled to the furnace aperture plug 105 using any suitable coupling devices including, but not limited to, a flange 215 extending between the reciprocator 110 and the plug 105. In an alternative embodiment of the present invention, the telescoping arm may be replaced by an alternative mechanical device capable of exerting a force upon the furnace aperture plug 105 to retract and extend the plug 105.

Preferably, the furnace aperture plug reciprocator 110 is controlled electronically. Additionally, the furnace aperture plug reciprocator 110 can be controlled automatically at a predetermined time, or can be controlled via an operator interface. The operator interface may be implemented using a switch, lever, software, or other operator interface mechanism. Alternatively, the furnace aperture plug reciprocator 110 may be controlled using various devices capable of inserting and retracting the furnace aperture plug 105.

In accordance with an exemplary embodiment of the present invention, the furnace aperture plug reciprocator 110 may be adapted to move the furnace aperture plug 105 through the furnace aperture 140 to clear slag from the aperture 140. Additionally, it is typically preferable to extend the furnace aperture plug 105 through the furnace aperture 140 periodically during a melt cycle to prevent substantial slag build up from clogging the aperture 140, which might otherwise prevent access to the interior of the furnace 100. Throughout a melt cycle, slag is created in the furnace 100 and may build up on any exposed device in the furnace 100.

If significant amounts of slag build up at the furnace aperture 140, it may be difficult to remove the slag quickly prior to accessing the melt through the furnace aperture 140. The slag can become hard when it adheres to a side wall 160 or to a furnace device, such as the furnace access apparatus 200. If slag builds up over the furnace aperture 140, depending on the level of build up, it may be necessary to clear the slag before accessing the interior of the furnace 100. Accordingly, it is desirable to avoid significant slag build up. An exemplary method for preventing slag buildup in accordance with the present invention involves reciprocating the furnace aperture plug 105 periodically to clear the aperture 140. The reciprocating motion preferably advances the plug 105 through the aperture 140 a sufficient distance to remove the slag and then returns the plug 105 to its position within the aperture 140. Typically, a distance of one to four inches is sufficient to clear the slag. The forward and back reciprocating motion of the plug 105 clears slag from the aperture 140 and prevents large quantities of slag from accumulating and hardening around the aperture 140.

In an exemplary embodiment of the present invention, the plug 105 is reciprocated multiple times during a melt cycle, preferably at least twice. If reciprocating the plug 105 twice during the melt cycle is not sufficient to keep the furnace aperture clear, the plug 105 may be reciprocated periodically throughout the melt cycle. An exemplary period for reciprocating the plug 105 is approximately once every five minutes. In furnace operations where slag buildup is extensive, it may be desirable to reciprocate the plug 105 at a more rapid rate.

It is desirable for the furnace aperture 140 to be clear of slag when the furnace is to be accessed through the furnace aperture 140. Accordingly, it may be desirable to reciprocate the furnace aperture plug just prior to accessing the furnace to remove addition slag proximate the furnace aperture 140.

In an alternative embodiment of the present invention, slag may be cleared from the furnace aperture by retracting the furnace aperture plug and injecting a stream of compressed air through the furnace aperture 140. The stream of air can blow slag away from the aperture 140. Alternatively, other gases, or liquids, may be in place of the compressed air.

As shown in FIG. 3, the furnace mounting enclosure 115 encases the furnace receptacle 120 and the furnace aperture plug 105. The furnace mounting enclosure 115 is preferably fluid cooled to protect it from the heat in the furnace. As shown in FIG. 3, fluid cooling channel 205 is provided to direct water, or other cooling fluid, through the furnace mounting enclosure 115.

The furnace mounting enclosure 115 preferably also includes a sloped porch 234 to direct scrap and debris toward the center of the furnace. Additionally, the sloped porch 234 may include corrugations to trap slag on the surface of the enclosure 115 to help insulate the enclosure 115 from the heat of the furnace.

Figure 4:
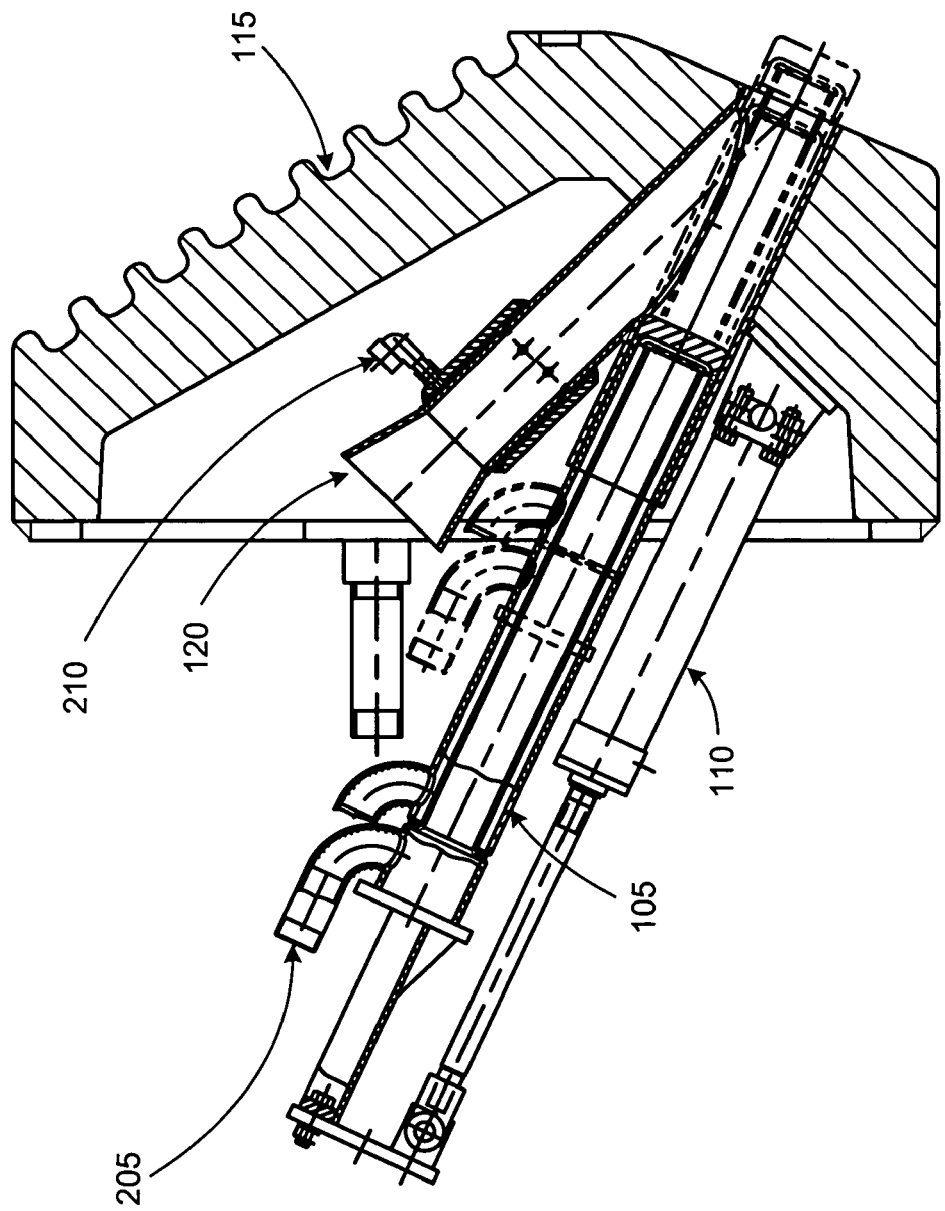
FIG. 4 is a cross-sectioned side view of the furnace access apparatus illustrated in FIG. 1, which shows the furnace aperture plug in both a retracted position and inserted position.

FIG. 4 is a cross-sectioned side view of the furnace access apparatus showing the aperture plug in both a retracted position and an inserted position. The solid lines in FIG. 4 show the furnace aperture plug 105 in a retracted position and the dashed lines illustrate the movement of the plug 105 to a closed position and also the reciprocating movement of the plug 105. FIG. 4 illustrates the relationship between the furnace aperture plug 105 positions in FIGS. 2 and 3.

The discussion below pertains to the use of the furnace access apparatus in three exemplary embodiments of the present invention, including the use of the furnace access apparatus to probe the characteristics of the melt, the use of the furnace access apparatus to insert chemicals into the melt, the use of the furnace access apparatus for granting access for a burner device, and the use of the furnace access apparatus for insertion of a lance device. Those of skill in the art will appreciate that these are simply four exemplary embodiments of the furnace access apparatus and numerous other embodiments of the furnace access apparatus are possible.

Probing

A notable part of the steel making process is the determination of the characteristics of the melt 150. Moreover, prior to removing portions of the melt 150 from the furnace 100, it is important to verify that the melt 150 has reached the appropriate temperature and has the desired characteristics. In an exemplary embodiment of the present invention, the temperature and chemical characteristics of the melt 150 can be measured using a probe. Those of ordinary skill in the art will be familiar with various probes available for measuring temperature and chemical composition of the melt 150.

Figure 5:
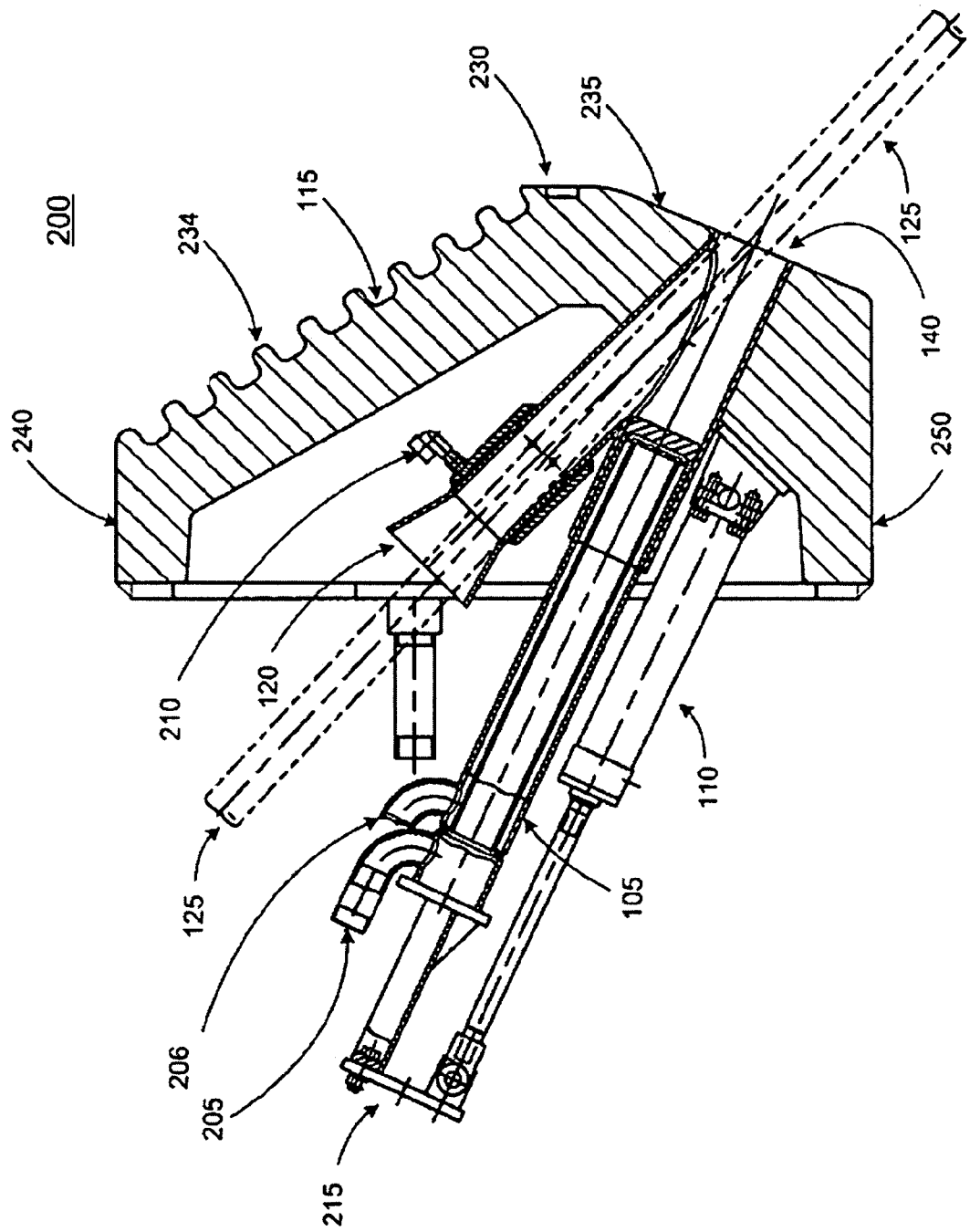
FIG. 5 is a cross-sectioned side view of the furnace access apparatus illustrated in FIG. 1 showing the furnace aperture plug in a retracted position and a furnace probe inserted through the furnace aperture.

As shown in FIG. 5, in an exemplary embodiment of the present invention, the furnace receptacle 120 is capable of receiving a furnace probe 125 when the furnace aperture plug 105 has been removed from the furnace aperture 140 by the furnace aperture plug reciprocator 110. Thereby, the furnace probe 125 is permitted to pass through the furnace aperture 140 and into the melt 150 (FIG. 1).

The furnace receptacle 120 is typically slanted downward at an angle, preferably between 30-60 degrees, to allow access through the furnace aperture 140 toward the metal melt 150 (FIG. 1) in the hearth of the furnace 100 (FIG. 1). To promote measurements being taken easily from the side wall 160 (FIG. 1), it is preferable that the probe 125 is inserted at an angle which is neither too shallow nor too steep. If the angle is too steep, the probe may contact the hearth of the furnace 100 on the low end, yielding inaccurate measurements, or interfere with the sidewall fluid cooled elements in the upper shell on the high end. If the angle is too shallow, an exceptionally long probe may be required to reach into the melt 150 (FIG. 1). More preferably, an angle of approximately 45 degrees (+/−15 degrees) is used.

In an exemplary embodiment of the present invention, the furnace receptacle 120 is preferably cylindrical in shape with an enlarged, funnel shaped, opening for directing the furnace probe 125 through the furnace aperture 140. Additionally, as shown in FIG. 5, the furnace receptacle 120 may include a compressed air channel 210 for injecting compressed air through the furnace receptacle 120 and the furnace aperture 140. The compressed air can blow any slag or debris away from the furnace aperture 140 when the furnace aperture plug 105 is retracted. It is preferable to inject compressed air through the furnace aperture 140 whenever the furnace aperture plug 105 is in a retracted position.

In an alternative embodiment of the present invention, the furnace aperture plug 125 may be omitted and a stream of compressed air can be continuously injected through the aperture to keep the opening free of slag and debris. Typically, this is not a desirable solution, due to the cost of continuously injecting compressed air and its cooling affect on the molten metal.

In an exemplary embodiment of the present invention, the furnace receptacle 120 includes a trigger for automatically injecting compressed air through the furnace aperture 140 when the furnace aperture plug 105 is retracted. Additionally, the trigger may be adapted to automatically shut off the compressed air flow when the furnace aperture plug 105 is reinserted into the furnace aperture 140.

In FIG. 5, the furnace access apparatus 200 is shown with the furnace aperture plug 105 retracted away from the furnace aperture 140. In use, the furnace aperture plug 105 is retracted to clear the furnace aperture 140 for insertion of a furnace probe 125. As is shown in FIG. 5, the furnace receptacle 120 directs a furnace probe 125 through the furnace aperture 140. Thus, the furnace probe 125, via the furnace receptacle 120, and the furnace receptacle plug 105 may be inserted into the same aperture. FIG. 5 also illustrates that the furnace probe 125 and the furnace receptacle 120 have intersecting paths. In order for the probe 125 to be inserted through the furnace aperture 140, the furnace aperture plug 105 should be retracted sufficiently to allow passage of the furnace probe 125. FIG. 5 illustrates this relationship as the furnace aperture plug 105 is retracted clear of the path of the probe 125.

Chemical Insertion

As previously described, the furnace access apparatus 200 provides access to the melt in a position sufficiently proximate the melt to allow for efficient and effective access to melt for a variety of tasks. In addition to probing the melt, another task that is typically desirable for creating and maintaining an efficient steel making process is the insertion of certain chemicals or other materials into the melt. For example, chemicals such as, but not limited to, lime, calcium, carbon, oxygen, aluminum, silicon, slag conditioners, and ferro-alloy additives, may be introduced into the bath to alter the chemical composition of the steel, alter the steel making process, or protect the furnace equipment.

In a non-limiting example, the chemical composition of the molten melt can be altered to reduce the carbon content to a selected level in accordance with the desired quality of the steel to be created. Decarburization, the process of reducing carbon content, can involve various steps in which substances are introduced into the melt that lead to a decrease in the percentage of carbon present in the melt. In a non-limiting example, the insertion of lime, along with other chemicals, decarburizes the melt. Not only does the insertion of lime aid in decarbuization, it also aids in the formation of an insulating foamy slag layer in the furnace, which decreases heat loss from the melt surface, reducing energy costs, and protecting the furnace components.

Figure 6:
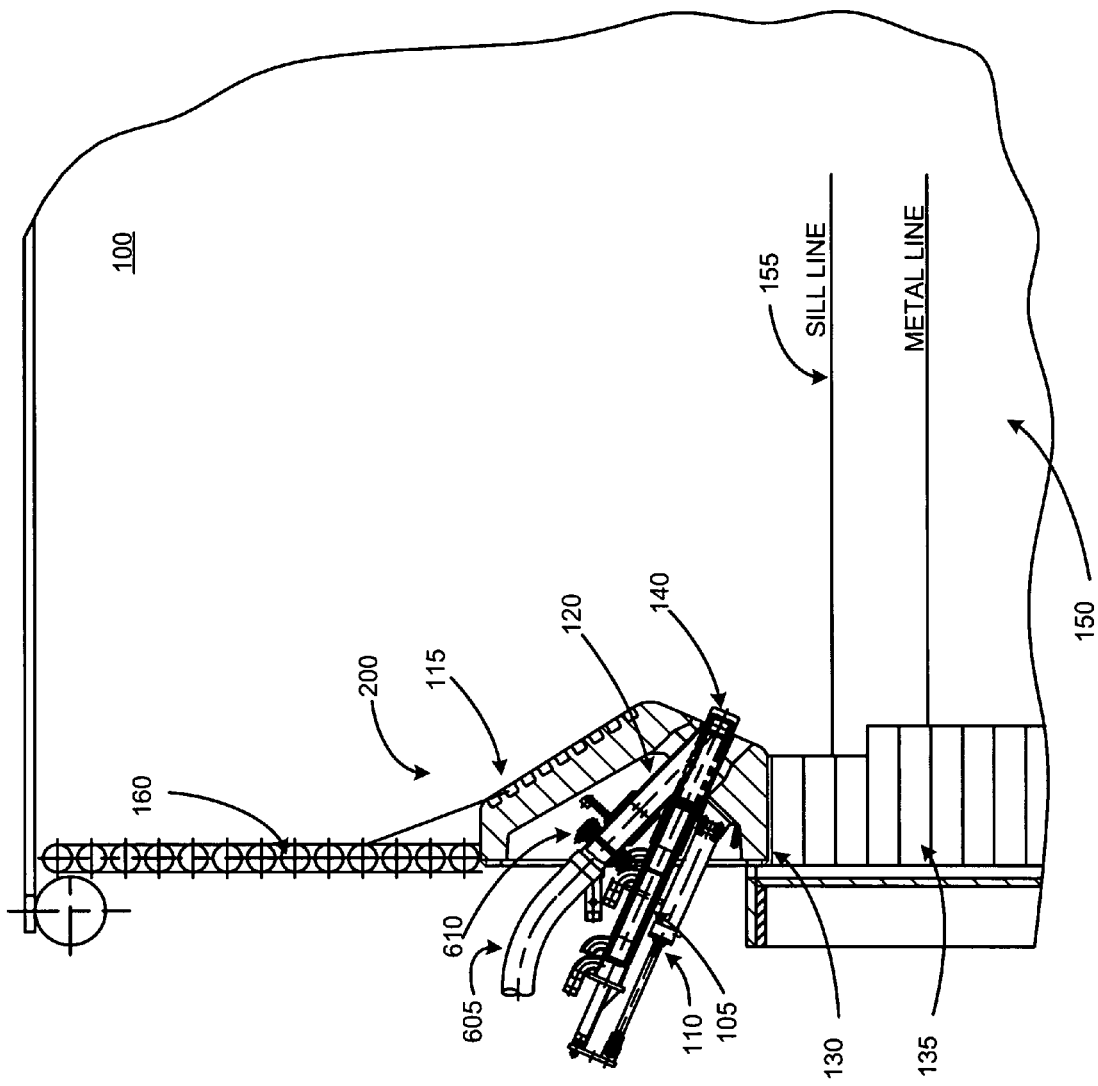
FIG. 6 is a cross-sectioned side view of the furnace access apparatus illustrated in FIG. 1, showing the furnace aperture plug in a retracted position and a chemical receptacle attached to the furnace receptacle.

FIG. 6 is a cross-sectioned side view of an alternative embodiment of the furnace access apparatus mounted in an EAF. As shown in FIG. 6, the furnace access apparatus 200, in accordance with an exemplary embodiment of the present invention, generally includes, but is not limited to, a furnace aperture 140, a furnace aperture plug reciprocator 110, and a furnace receptacle 120. In an exemplary embodiment, the furnace receptacle 120 is aligned with the furnace aperture 140 for accessing the interior of the furnace when the furnace plug is retracted. In an exemplary embodiment depicted in FIG. 6, the furnace access apparatus 200 includes a chemical receptacle 605. In an exemplary embodiment, the chemical receptacle 605 is connected to the furnace receptacle 120 by a connecting device 610.

When the furnace aperture plug 105 is in the retracted position, as shown in FIG. 6, the furnace aperture 140 provides access to the melt 150 in a position sufficiently proximate the melt 150 to allow for efficient and effective access to melt 150 for chemical insertion. In an exemplary embodiment, this chemical insertion is accomplished by inserting a chemical into the chemical receptacle 605, which passes the chemical through the furnace receptacle 120, through furnace aperture 140, and into the melt 150.

In providing for chemical insertion into the furnace, it is often preferable to insert chemicals into the furnace at a desired location and a desired angle. Just as the location of the furnace aperture 140 may provide a preferred position and angle for access to the melt 150 for probing purposes, the furnace aperture 140 may provide a preferred position and angle for access to the melt 150 for the insertion of chemicals. More particularly, the close proximity of the furnace aperture 140 to the melt 150, due to its placement near the sill line 155, provides for efficient and effective insertion of chemicals into the melt 150. In exemplary embodiment, the furnace access apparatus 200, is preferably mounted adjacent an opening in the fluid cooling side wall panel 160 of the furnace 100. In the illustrated embodiment, the mounting enclosure 115 preferably rests on the step 130 formed between the panels of the side wall 160 of the upper shell of the furnace 100 and the refractory wall of the hearth 135. Alternatively, the furnace access apparatus 200 could be supported or suspended from another suitable structural member of the furnace 100.

Figure 7:
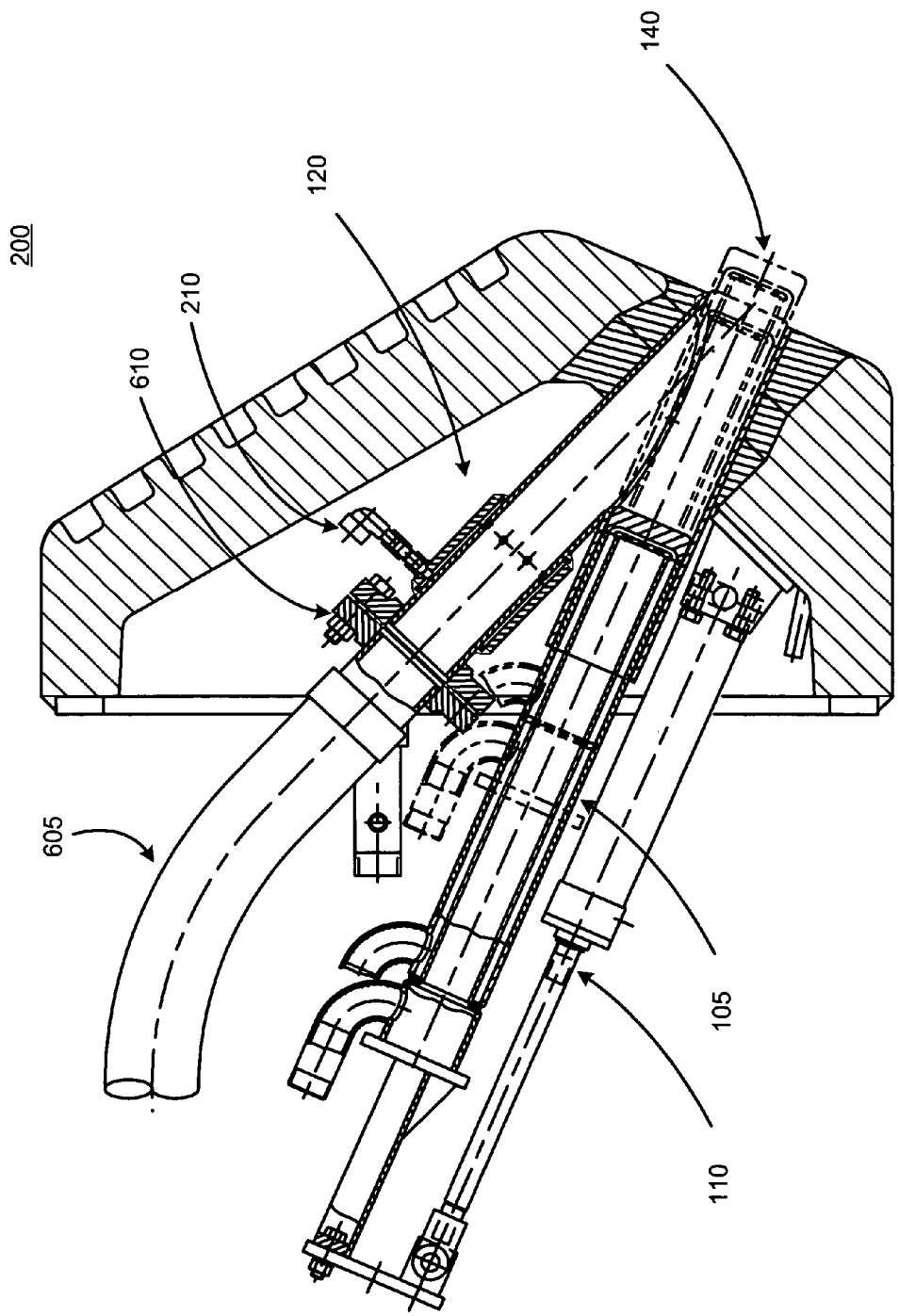
FIG. 7 is a cross-sectioned side view of the furnace access apparatus illustrated in FIG. 1, showing the furnace aperture plug in a retracted position and a chemical receptacle attached to the furnace receptacle.

FIG. 7 is a cross-sectioned side view of the furnace access apparatus illustrated in FIG. 6. In an exemplary embodiment of the present invention, as shown in FIG. 7, the furnace receptacle 120 is capable of receiving chemicals, which can then pass through the furnace aperture 140 and into the melt. As previously mentioned, the furnace receptacle 120 may include a compressed air channel 210. Through this compressed air channel 210, air can be introduced into the furnace through the furnace aperture 140 when the furnace aperture plug 105 is retracted. In the exemplary embodiment depicted in FIG. 7, the furnace receptacle 120 is enabled to provide for the insertion of chemicals into the melt, in addition to that of air through the compressed air channel 210.

In the exemplary embodiment depicted in FIG. 7, a chemical receptacle 605 is provided that can be connected to the furnace receptacle 120. In one embodiment, the chemical receptacle 605 is tubing through which chemicals are passed. In alternative embodiments, the chemical receptacle 605 may be piping or simply a funnel with an opening capable of being accessed by an operator.

In an exemplary embodiment, the furnace access apparatus 200 enables the furnace operator to manually or automatically insert a predetermined amount of a chemical substance into the melt 150 (FIG. 1). In a non-limiting example, the operator may insert a specific amount of lime through the chemical receptacle 605, through the furnace aperture 140, and into the melt 150 (FIG. 1).

In some embodiments, the operator may automatically insert a specified amount of a chemical substance at a specific point in the process. This automatic insertion of a chemical substance may be associated with a specific time in the steel making process, or be associated with certain trigger parameters, such as when the melt reaches a certain chemical composition or when the temperature rises to a certain level. In other embodiments, the operator, may manually insert the chemical substances.

Burner Device

Figure 8:
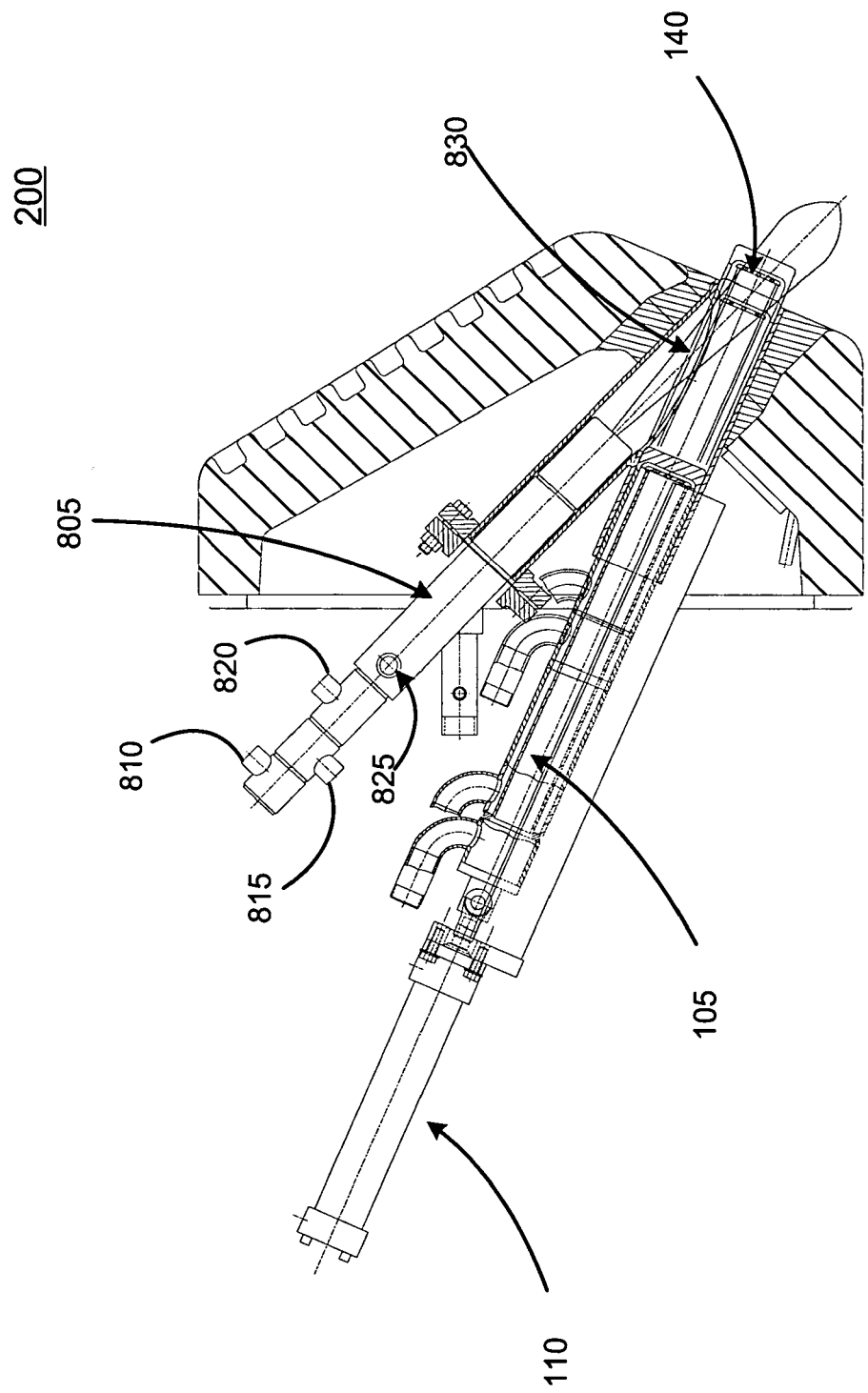
FIG. 8 is a cross-sectioned side view of the furnace access apparatus illustrated in FIG. 1, showing the furnace aperture plug in a retracted position and a burner device enabled to insert a flame through the furnace aperture.

FIG. 8 is a cross-sectioned side view of an alternative embodiment of the furnace access apparatus mounted in a furnace. In an alternative embodiment of the furnace access apparatus 200, the furnace aperture 140 is capable of receiving a burner device. Burner devices are used to insert a flame, created by the mixture of oxygen and fuel, into the melt to aid in the melting process. Those of skill in the art will appreciate that a wide variety of burner devices are available and many of these devices could be used without detracting from the scope of the invention. In an exemplary embodiment the burner is a oxygen-fuel carbon burner. In an alternative embodiment, the burner device could be a burner/lance device or a device providing other combinations of features.

The furnace access apparatus 200 may include a burner device 805 capable of inserting a flame into the furnace through the furnace aperture 140 when the furnace aperture plug 105 has been removed by the furnace aperture plug reciprocator 110. The burner device 805 may have fluid channels for cooling the exterior surfaces of the burner device 805. In the exemplary embodiment illustrated in FIG. 8, the burner device 805 has a fluid input port 810 and a fluid output port 815. For example, and not limitation, fluid can be flushed through the fluid channels of the burner device 805 while the burner device 805 is in operation to keep the device relatively cool. In the exemplary embodiment depicted in FIG. 8, the burner device 805 is an oxygen-fuel burner, and it provides an oxygen inlet 820 and fuel inlet 825. Through these inlet ports, 820 and 825, the necessary oxygen and fuel can be supplied to the burner device 805.

In a non-limiting example, the operator may remove the slag buildup around the furnace aperture 140 through the use of the furnace aperture plug reciprocator 110, then remove the furnace aperture plug 105 thereby providing access to the furnace 100 through the furnace aperture 140. Once the furnace aperture has been exposed the operator may activate the burner device 805 and insert a flame 830 from the burner device 805 through the furnace aperture 140 and into the furnace 100.

Thus, in an exemplary embodiment the operator may be provided with an intermittent burner device 805. This burner device 805 may be used to insert the necessary thermal energy when required to advance the melting process. Once the necessary temperatures have been reached, the operator may then close off the burner device 805 from the furnace environment by causing the furnace aperture plug 105 to be reinserted into the furnace aperture 140 by the furnace aperture plug reciprocator 110. In this manner, the operator may be provided with a protected burner device that may be used at the operator's discretion.

Lance Device

In an alternative embodiment of the furnace access apparatus 200, the furnace aperture 140 is capable of receiving a lance device. Lances are used to insert or inject a chemical substance into the melt to change the chemical characteristics of the melt. In an non-limiting example, an oxygen lance can be used to decarburize the melt. The higher the rate of oxygen injected into the melt, the higher the rate of decarburization. Those of skill in the art will appreciate that a wide variety of lance devices are available and any of these devices could be used without detracting from the scope of the invention. In a non-limiting example, lance device could be an oxygen lance, a carbon injection device, or a device providing a combination thereof.

It is typically desirable in efficient and effective steel making to be able to lance oxygen or other substance throughout a number of reaction zones within the iron carbon melt. In an exemplary embodiment, the furnace access apparatus 200 provides the operator with a preferable position within the furnace to insert chemicals through a lance.

The furnace access apparatus 200 may include a lance device capable of being inserted through the furnace aperture 140 when the furnace aperture plug 105 has been removed by the furnace aperture plug reciprocator 110. In an non-limiting example, the operator could remove the slag buildup around the furnace aperture 140 through the use of the furnace aperture plug reciprocator 110, then remove the furnace aperture plug 105 and insert the lance device into the furnace through the furnace aperture 140. In one non-limiting circumstance, the lance device could be used to insert oxygen through the lance into the iron carbon melt during the decarburization of the melt.

The furnace access apparatus 200 permits the operator to insert the lance device through the furnace aperture 140 and into the interior of the furnace. The lance device can be inserted by a variety of different mechanisms and configurations. In an exemplary embodiment, the lance device is attached to a reciprocating device that is similar to the furnace aperture plug reciprocator 110 for the furnace aperture plug 105. Thereby, when the furnace aperture plug 105 is removed from the furnace aperture 140, the lance device is then inserted through the furnace aperture 140 by another reciprocating device attached to the lance device. In an alternative embodiment, the lance device is operated manually and when the furnace aperture 140 is open, the lance device can be inserted through the furnace aperture 140. Those of skill in the art will appreciate that the lance could be inserted through furnace aperture 140 by a variety of methods and devices without detracting from the scope of the invention.

Upon completion of the use of the lance device, the lance device may be removed from the furnace aperture 140. Once the lance device has been removed from the furnace aperture 140, the furnace aperture plug reciprocator 110 may reinsert the furnace aperture plug 105 into the furnace aperture 140. As previously provided, the furnace aperture 140 may be kept free of slag through the reciprocation of the furnace aperture plug 105 by the furnace aperture plug reciprocator 110; thus permitting unobstructed access to the melt by the lance device upon insertion into the furnace aperture 140.

The lance device may be configured to penetrate beyond the furnace aperture 140 and into the interior of the furnace 100. In a non-limiting example, the reciprocator attached to the lance device may cause the lance device to protrude a distance beyond the furnace aperture 140 and into the furnace 100.

Alternatively, the furnace access apparatus 200 may be provided with a burner/lance device capable of being inserted into the furnace after the furnace aperture 140 has been exposed by the removal of the furnace aperture plug 105 by the furnace aperture plug reciprocator 110. As with the lance device, the burner device or the burner/lance device may be inserted and removed by a reciprocator device, manual operation, or other method or device.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all applicable equivalents.

I claim:

1. A furnace access apparatus, comprising:
a furnace device in direct, linear communication with the interior of a metal melt furnace through a furnace aperture along a first axis;
a furnace aperture plug for insertion into the furnace aperture along a second axis that is not co-axial with the first axis; and
a powered furnace aperture plug reciprocator coupled to the furnace aperture plug for reciprocating the furnace aperture plug in the furnace aperture and for inserting and removing the furnace aperture plug from the furnace aperture;
wherein the furnace aperture plug prevents communication between the furnace device and the interior of the metal melt furnace when the furnace aperture plug is in a closed position and allows communication between the furnace device and the interior of the metal melt furnace without moving the furnace device when the furnace aperture plug is in an open position.

2. The apparatus of claim 1, wherein the furnace aperture is adapted to receive a furnace probe when the furnace aperture plug is removed from the furnace aperture.

3. The apparatus of claim 1, wherein the furnace aperture is adapted to receive at least one chemical substance when the furnace aperture plug is removed from the furnace aperture.

4. The apparatus of claim 1, wherein the furnace aperture is adapted to receive a burner device when the furnace aperture plug is removed from the furnace aperture.

5. The apparatus of claim 1, wherein the furnace aperture is adapted to receive a lance device when the furnace aperture plug is removed from the furnace aperture.

6. The apparatus of claim 1, wherein the furnace aperture plug reciprocator is further adapted to periodically reciprocate the furnace aperture plug during a melt cycle of the metal melt furnace.

7. The apparatus of claim 1, wherein the furnace aperture plug reciprocator is further adapted to reciprocate the furnace aperture plug at least twice during a melt cycle.

8. The apparatus of claim 1, wherein the furnace aperture plug reciprocator is adapted to move the furnace aperture plug linearly.

9. The apparatus of claim 1, wherein the furnace aperture plug reciprocator moves the furnace aperture plug by manual operation.

10. The apparatus of claim 1, wherein the furnace aperture plug reciprocator moves the furnace aperture plug automatically.

11. The apparatus of claim 1, wherein the furnace aperture plug reciprocator returns the furnace aperture plug to substantially the same location from which the furnace aperture plug was removed.

12. A furnace melt chemical insertion apparatus for use in a metal melt furnace, comprising:
a first port with direct, linear access to the interior of a metal melt furnace, having a first end and a second end;
a second port having a first end and a second end, the second end of the second port and the second end of the first port converging at a furnace aperture such that the first port and the second port form a substantially v-shaped channel;
a furnace aperture plug adapted for insertion through the second port and into the furnace aperture;
a powered furnace aperture plug reciprocator coupled to the furnace aperture plug for reciprocating the furnace aperture plug in the furnace aperture and for inserting and removing the furnace aperture plug from the furnace aperture; and
a chemical receptacle for receiving and directing a chemical along a first axis through the first port and the furnace aperture into the metal melt furnace.

13. The apparatus of claim 12, wherein chemical directed through the furnace aperture is lime.

14. The apparatus of claim 12, wherein chemical directed through the furnace aperture is calcium.

15. The apparatus of claim 12, wherein chemical directed through the furnace aperture is a slag conditioner.

16. The apparatus of claim 12, wherein the furnace aperture plug reciprocator is further adapted to periodically reciprocate the furnace aperture plug during a melt cycle of the metal melt furnace.

17. The apparatus of claim 12, wherein the furnace aperture plug reciprocator is further adapted to reciprocate the furnace aperture plug at least twice during a melt cycle.

18. A furnace access apparatus, comprising:
a fluid cooled mounting enclosure having a furnace aperture and adapted for mounting inside a metal melt furnace;
a furnace device with direct, linear access to the inside of the metal melt furnace through the furnace aperture and coupled to the interior of the mounting enclosure along a first axis;
a fluid cooled furnace plug for insertion into the furnace aperture and coupled to the interior of the mounting enclosure along a second axis that is non-coaxial with the first axis; and
a furnace plug reciprocator coupled to the mounting enclosure and fastened to the fluid cooled furnace plug and adapted to reciprocate the fluid cooled furnace plug along the second axis and to remove the fluid cooled furnace plug from the furnace aperture;
wherein the furnace aperture plug prevents communication between the furnace device and the inside of the metal melt furnace when the furnace aperture plug is in a closed position and allows communication between the furnace device and the inside of the metal melt furnace without moving the furnace device when the furnace aperture plug is in an open position.

* * * * *